(12) United States Patent
Chumbley

(10) Patent No.: US 11,170,365 B2
(45) Date of Patent: Nov. 9, 2021

(54) DIGITAL WALLET MERCHANT-SPECIFIC VIRTUAL PAYMENT ACCOUNTS

(71) Applicant: Visa International Service Association, San Francisco, CA (US)

(72) Inventor: Robert Chumbley, Round Rock, TX (US)

(73) Assignee: Visa International Service Association, San Francisco, CA (US)

(*) Notice: Subject to any disclaimer, the term of this patent is extended or adjusted under 35 U.S.C. 154(b) by 1165 days.

(21) Appl. No.: 15/298,018

(22) Filed: Oct. 19, 2016

(65) Prior Publication Data

US 2018/0108008 A1 Apr. 19, 2018

(51) Int. Cl.
*G06Q 20/32* (2012.01)
*G06Q 20/36* (2012.01)
*G06Q 20/22* (2012.01)

(52) U.S. Cl.
CPC ....... *G06Q 20/3674* (2013.01); *G06Q 20/227* (2013.01); *G06Q 20/32* (2013.01); *G06Q 20/3226* (2013.01); *G06Q 20/36* (2013.01)

(58) Field of Classification Search
CPC ........ G06Q 40/00; G06Q 40/02; G06Q 20/10; G06Q 20/102; G06Q 20/3678;
(Continued)

(56) References Cited

U.S. PATENT DOCUMENTS 7,996,288 B1 8/2011 Stolfo
2004/0249753 A1* 12/2004 Blinn .................. G06Q 20/403
705/41

(Continued)

FOREIGN PATENT DOCUMENTS

WO 2015054697 4/2015

OTHER PUBLICATIONS

Bell, S. (Mar. 22, 2011). Web retailer offers E-wallet. American Banker Retrieved from https://dialog.proquest.com/professional/docview/859012108?accountid=131444. Year 2011.*

(Continued)

*Primary Examiner* — Hani M Kazimi
(74) *Attorney, Agent, or Firm* — Kilpatrick Townsend & Stockton LLP

(57) ABSTRACT

Embodiments of the invention are directed to systems and methods for securely and efficiently updating account information across resource providers. Embodiments of the invention provide a method for managing account data that is an improvement in both speed and security over prior methods used by account data management systems. According to embodiments of the invention, account data is linked to resource provider specific tokens stored and managed by a digital wallet provider. Resource provider specific tokens may be stored by resource providers to conduct future transactions, also including recurring or automatic transactions. To manage the resource provider specific tokens, a user may simply send requests to the digital wallet provider using a single interface displayed on a user device rather than by logging into accounts for numerous resource providers and continuously entering updated account data.

21 Claims, 9 Drawing Sheets

(58) Field of Classification Search
CPC .... G06Q 20/4016; G06Q 30/02; G06Q 30/06; G06Q 20/3674; G06Q 20/227; G06Q 20/32; G06Q 20/3226; G06Q 20/36
USPC .................................................. 705/39–44
See application file for complete search history.

(56) References Cited

U.S. PATENT DOCUMENTS

| | | |
|---|---|---|
| 2010/0145860 A1 | 6/2010 | Pelegero |
| 2011/0060629 A1 | 3/2011 | Yoder et al. |
| 2012/0158584 A1* | 6/2012 | Behren ............... G06Q 20/105 705/41 |
| 2012/0158654 A1* | 6/2012 | Behren ............... G06Q 30/06 707/626 |
| 2012/0234912 A1* | 9/2012 | Yankovich ........... G06Q 40/04 235/379 |
| 2014/0129435 A1* | 5/2014 | Pardo ............... G06Q 20/227 705/41 |
| 2014/0149293 A1 | 5/2014 | Laracey |
| 2014/0372308 A1 | 12/2014 | Sheets |
| 2015/0032625 A1 | 1/2015 | Dill et al. |
| 2015/0095175 A1 | 4/2015 | Dua |
| 2015/0112870 A1 | 4/2015 | Nagasundaram et al. |
| 2015/0149353 A1 | 5/2015 | Linden et al. |
| 2015/0220916 A1* | 8/2015 | Prakash ............... G06Q 20/40 705/41 |
| 2015/0319158 A1 | 11/2015 | Kumnick |
| 2016/0155117 A1 | 6/2016 | Badenhorst |
| 2016/0232527 A1 | 8/2016 | Patterson |
| 2017/0091757 A1* | 3/2017 | Lloyd ............... G06Q 20/227 |
| 2017/0372301 A1* | 12/2017 | Theurer ............... G06Q 20/28 |

OTHER PUBLICATIONS

"How do I Change the way I pay for a recurring payment, subscription, automatic billing, or installment plan?"https://www.paypal.com/selfhelp/article/FAQ1414, downloaded Oct. 19, 2016, 3 pages.

PayPal preapproved payments screenshot, Anonymous, date unknown, 2 pages.

International Search Report and Written Opinion, dated Oct. 18, 2017, in PCT Application No. PCT/US2017/057174, 15 pages.

EP17861541.5 , "Extended European Search Report", dated Jul. 30, 2019, 9 pages.

* cited by examiner

| Resource Provider Specific Token | Merchant ID | Creation Date | Wallet ID | User Name | Shipping Address | Account Name | PAN |
|---|---|---|---|---|---|---|---|
| ....4321 | Best Buy | 9/16/2016 | 47321 | John Smith | 1234 Ocean Ave. | AMEX GOLD | ...8392 |
| ....1287 | PG&E | 8/24/2016 | 47321 | John Smith | 1234 Ocean Ave. | AMEX GOLD | ...8392 |
| ....2152 | Spotify | 7/25/2016 | 47321 | John Smith | 1234 Ocean Ave. | Chase Freedom | ...4242 |
| ....5212 | Sprint Wireless | 8/24/2016 | 20345 | Emily Nguyen | 9241 Mission St. | Chase Slate | ...2425 |
| ....1253 | Netflix | 2/2/2016 | 20345 | Emily Nguyen | 9241 Mission St. | Discover | ...2512 |
| ....1255 | Sports Illustrated | 2/3/2016 | 29482 | Julio Jones | 2904 Sesame St. | Chase Sapphire | ...2153 |

310 — 320 — 330 — 340 — 350

| CVV2 | Billing Address | Last Update |
|---|---|---|
| 209 | 8483 Houston St. | 9/22/2016 |
| 209 | 8483 Houston St. | 9/17/2016 |
| 802 | 1234 Ocean Ave. | 9/20/2016 |
| 212 | 9241 Mission St. | 8/27/2016 |
| 152 | 9241 Mission St. | 10/1/2016 |
| 214 | 3412 Elm St. | 6/3/2016 |

DIGITAL WALLET MERCHANT-SPECIFIC VIRTUAL PAYMENT ACCOUNTS

CROSS-REFERENCE TO RELATED APPLICATIONS

None.

BACKGROUND

In today's technological environment, consumers often find it easiest to pay bills online. These bills are typically monthly statements regarding products or services that a consumer has consumed during the span of a given month. To make this process even easier for consumers, the providers of these goods and services will set-up automatic payments for the consumers by saving a consumer's payment information and a specified monthly payment amount that the provider will charge the consumer's account on a given date such as the payment due date.

For example, a consumer may want to automatically pay his or her phone bill online. In order to set up automatic payment of his or her statement each month, the consumer would register an online account with the service provider at the service provider's website (e.g. https://www.spring.com/, https://www.att.com/, etc.). The consumer would then enter his or her payment account information, as written on a payment card for example, into a form along with a specified amount and date of payment, where the merchant would then store the text entered into the form and use it to conduct transactions. To manage these automatic payments, a consumer must go to the service provider's website and log into his or her account using a username and password for his or her online account registered with the provider. The consumer would then have to re-submit an automatic payment form with any updated information in order to change settings for their account, such as the specified payment account with which automatic payments are made.

Often times, a consumer will have multiple online accounts with multiple service providers. For example, a consumer may use a variety of online streaming services such as Netflix™, Spotify™, and Hulu™. If a consumer wishes to change the payment account associated with automatic payment for these services, the consumer would need to visit each service provider website, enter his or her username and password for the consumer's registered account specific to that service provider, and then enter his or her new payment account information into a form at each website so that the service provider can update the registered account. This is a process that is both time-consuming and unsecure, as a user is continuously entering his or her payment account information online.

Embodiments of the invention address this and other problems, individually and collectively.

BRIEF SUMMARY

Embodiments of the invention are directed to systems and methods for securely and efficiently updating account information across resource providers.

One embodiment of the invention is directed to a method. The method comprises receiving, by a server computer, a request for a resource provider specific token, the request comprising a resource provider identifier for a resource provider and a selection of a first account; requesting, by the server computer from a token provider computer, the resource provider specific token; receiving, by the server computer, the resource provider specific token; linking and storing in a database, by the server computer, the received resource provider specific token with the first account and the resource provider identifier; receiving a request to associate the resource provider specific token to a second account; and linking and storing, by the digital wallet server computer, the resource provider specific token with the second account and the resource provider identifier, the resource provider specific token no longer linked to the first account.

In another embodiment, the method further comprises providing, by the server computer, the resource provider specific token to a computer operated by the resource provider; receiving, by the server computer, in a transaction conducted by the resource provider computer using the resource provider specific token, a request from the token provider computer for account details associated with the resource provider specific token; determining, by the server computer, that the resource provider specific token is linked to the second account; and providing, by the server computer, an identifier of the second account to the token provider computer, wherein the token provider computer modifies a message with the identifier of the second account and forwards the modified message to an issuer computer associated with an issuer of the second account, where the issuer of the second account approves or disapproves of the transaction.

Another embodiment of the invention is directed to a method comprising receiving, by a token provider computer, from a resource provider computer, in a transaction, a message comprising a resource provider specific token; determining, by the token provider computer, that the resource provider specific token is managed by a server computer; sending, by the token provider computer, to the server computer, a request for account details of an account and a resource provider identifier linked to the resource provider specific token, wherein the token management computer may link and unlink the resource provider specific token to different accounts; receiving, by the token provider computer, from the server computer, the account details of the account and the resource provider identifier linked to the resource provider specific token; comparing, by the token provider computer, the received resource provider identifier with an identifier for the resource provider computer; and validating, by the token provider computer, the resource provider specific token if the received resource provider identifier matches the identifier for the resource provider computer.

Other embodiments of the invention are directed to server computers, each comprising: a processor; and a computer readable medium comprising code, executable by the processor, for implementing the above-described methods.

These and other embodiments of the invention are described in further detail below.

BRIEF DESCRIPTION OF THE DRAWINGS

FIG. 3 shows an example of a database table managed by a digital wallet server computer according to an embodiment of the invention.

DETAILED DESCRIPTION

Figure 1:
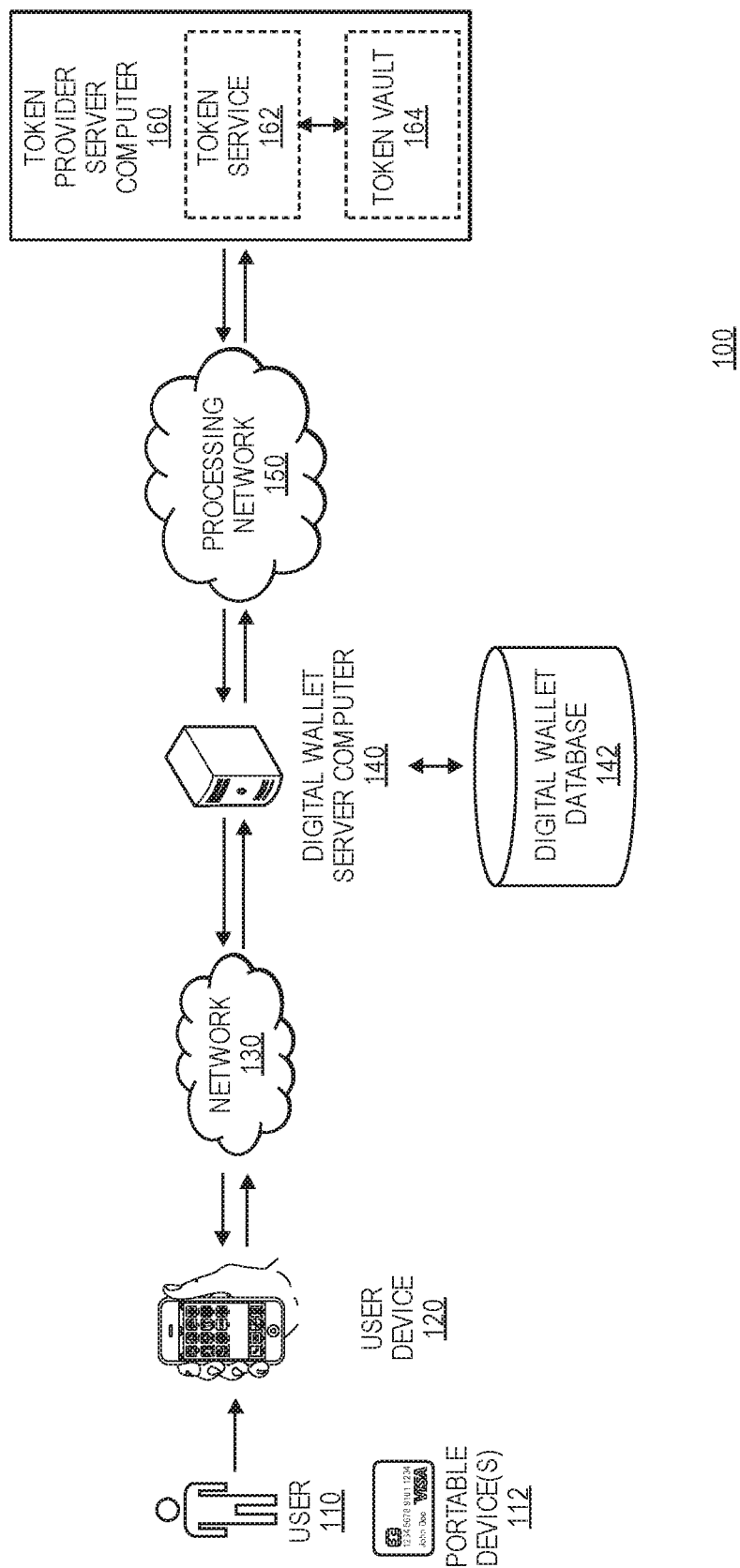
FIG. 1 shows a diagram of a system for requesting and generating a resource provider specific token according to embodiments of the invention.

Embodiments of the present invention provide techniques for managing account data used to conduct transactions at a multitude of resource provider computers in a secure and time-efficient manner.

Prior to discussing the details of some embodiments of the present invention, description of some terms may be helpful in understanding the various embodiments.

A "user device" may comprise a device that may be used by a user. A user device may comprise elements such as a display, a processor, a memory, an input device, and a network interface. Examples of a user device may include mobile devices, personal computing devices (e.g. desktop computers, laptop computers, tablets, etc.), or any device that may be fitted with the above elements including televisions, vehicles, telephones, or any other object that a user may use that contains the above elements.

A "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, wearable devices (e.g., watches, glasses, lenses, tattoos, clothing, etc.), vehicles (e.g., cars), etc. A mobile device may comprise any suitable hardware and software for performing such functions, and may also include multiple devices or components (e.g., when a device has remote access to a network by tethering to another device—i.e., using the other device as a relay—both devices taken together may be considered a single mobile device).

An "application" may be computer code or other data stored on a computer readable medium (e.g. memory element or secure element) that may be executable by a processor to complete a task. An application may be stored on a user device such as a mobile device and may provide a graphical user interface that allows a user to input commands to achieve a task. An application may receive user commands and may transmit the commands as messages sent over a network to a remote server computer using a network interface of the device. An application may access various elements of a user device to achieve a task such as a camera, microphone, contactless element, etc.

A "portable device" may be a device that is portable. A portable device may, for example, be used to conduct a transaction. A portable device may include a storage technology (e.g., electronic memory, magnetic stripe, etc.) to store credentials or tokens associated with an account of a user. A portable device can be in any of the forms described above with respect to the mobile device, or in the form of a card (e.g., integrated chip card, magnetic stripe card) or a fob, etc. In some embodiments, the portable device and the mobile device may be the same device, and need not be separate devices. Specific examples of portable devices can include wearable devices, payment cards such as credit, debit, and prepaid cards, vehicles with remote communication capabilities, etc.

A "server computer" may include a powerful computer or cluster of computers. For example, the server computer can be a large mainframe, a minicomputer cluster, or a group of servers functioning as a unit. In one example, a server computer may be a database server coupled to a Web server. A server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "access device" may be any suitable device for providing access to an external computer system. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. An "authorization request message" may sometimes be referred to as an "authorization request." The authorization request message can be sent to a processing network such as a payment processing network and/or an issuer of a payment card or any other authorizing entity or authorizing entity server computer. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. An "authorization response message" may sometimes be referred to as an "authorization response." The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization.

"Account data" may be data that may be associated or linked to an account. An account may be an arrangement between a user and an entity. An account may be accessed by a user upon entering of credentials such as a user name or password. An account may be an arrangement by which an entity holds resources or funds on behalf of a user. Account data may be a representation of account information that may be transmitted, received, and stored by a device such as a computer, server computer, portable device, mobile device, etc.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A "value credential" may be information associated with worth. Examples of value credentials include payment credentials, coupon identifiers, information needed to obtain a promotional offer, etc.

A "payment credential" may include any suitable credential that can be used to conduct a payment transaction. Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc.

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of mobile devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a mobile device can function as a payment device (e.g., a mobile device can store and be able to transmit payment credentials for a transaction).

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier.

A "token provider" or "token service system" can include a system that services payment tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "token vault" may be a location where tokens are stored. A token vault may be a secure database or centralized server in which tokens are stored and linked to credentials that they represent. A token vault may be managed by a token provider or token service system and/or payment processing network. A token vault may be compliant with industry standards and/or specifications such as Payment Card Industry (PCI) specifications.

A "token request message" may be an electronic message for requesting a token. A token request message may include information usable for identifying a payment account or digital wallet, and/or information for generating a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key).

A "token response message" may be a message that responds to a token request. A token response message may include an indication that a token request was approved or denied. A token response message may also include a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key).

A "digital wallet" can include an electronic device or software that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile device or access device. A digital wallet provider may comprise of one or more digital wallet server computers and digital wallet databases that are used to manage account data for a user of a digital wallet.

A "resource provider" may be an entity that can provide a resource such as goods, services, information, and/or access. Examples of a resource provider includes merchants, data providers such as government agencies, transit agencies, etc. A "merchant" may typically be an entity that engages in transactions and can sell goods or services, or provide access to goods or services.

A "resource provider identifier" can include any suitable type of information that can identify a resource provider or a location of a resource provider. Examples of resource provider identifiers may include a merchant ID, a store ID, a device ID of a device at a resource provider location, a major value (e.g., a store major value), a minor value (e.g., a store minor value), etc.

An "acquirer" or "acquiring entity" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorization computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

An "account identifier" may include an identifier for an account. An account identifier may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "cryptographic pattern" may include cryptographically secure data. Examples of cryptographic patterns may include cryptographic hashes, encrypted data, etc.

FIG. 1 illustrates a system 100 according to an embodiment of the invention. The method and system 100 can be used to request and generate tokens that are specific to a resource provider such as a merchant.

System 100 includes a user 110, a portable device 112 (e.g., a payment card), a user device 120 (e.g. a mobile device such as a mobile phone or any other computing device such as a personal computer), a network 130 (e.g. the Internet), a digital wallet server computer 140, a digital wallet database 142, a processing network 150, and a token provider server computer 160, which may comprise a token service 162 and a token vault 164. Token provider server computer 160 may further comprise instructions for validating a transaction. Each of the user device 120, the digital wallet server computer 140, the digital wallet database 142, the processing network 150 and the token provider server computer 160 may be in operative communication with each other.

User 110 may enter account information or account data imprinted or stored on portable device 112 into user device 120. This may be done using an interface provided by an application, such as a digital wallet application, that is stored in the memory of user device 120 or by an interface provided by a website associated with digital wallet server computer 140. The account data may comprise an account identifier, such as an account number, a routing number, a card verification value (CVV or CVV2), an account name, an account owner name, a billing address, shipping address of user 110, or any other pertinent information that may be used to identify the account or the identity of user 110 to whom the account belongs to. The account data may be entered into user device 120 using any input method provided by the capabilities and device elements of user device 120. For example, user 110 may read the account information stored or imprinted on portable device 112 and use a keyboard or touchscreen of user device 120 to enter the read information into a text field displayed on user device 120. As another example, user device 120 may contain a contactless element capable of wirelessly communicating with a chip contained in portable device 112 that stores account data, and user 110 may place portable device 112 in close proximity to user device 120 so that the contactless element of user device 120 may read the information stored on portable device 112. In another example, user device 120 may comprise a scanning device such as a camera as well as optical character recognition (OCR) software, and user 110 may scan account information imprinted on portable device 112 by placing portable device 112 in view of the scanning device, where an image of the account information may be captured and processed into data using OCR. The user may enter a plurality of account data for a plurality of accounts associated with a plurality of portable devices into user device 120.

User device 120 may then use a network interface to transmit the account data over network 130 to the digital wallet server computer 140. The account data is received over network 130 by digital wallet server computer 140, where it is linked in digital wallet database 142 to an account created by digital wallet server computer 140 that is specific to user 110 or specific to user device 120, such as a digital wallet account that comprises a wallet ID. User 110 may further enter any additional user details that they wish to store in digital wallet database 142 and associate with his or her digital wallet account, such as a shipping address, billing address, username, password, biometric information, etc.

Digital wallet server computer 140 may extract the account identifier from the entered account information and call out to token provider server computer 160 for the creation of a generic account token that may be linked to the account identifier. Digital wallet server computer may send a token request message containing the account identifier to token provider server computer 160 for a generic account token that may be used to conduct transactions. After token provider server computer 160 receives the token request message containing the account identifier, token service 162 may then request a token from token vault 164.

Token vault 164 may be a secure centralized server or database where issued tokens and account identifiers that they represent, are securely stored and linked. Token vault 164 may associate the received account identifier with a generic account token and then transmit the generic account token to token service 162 in a token response message. After receiving the generic account token, token service 162 may send the token response message containing the generic account token to digital wallet server computer 140. Digital wallet server computer 140 may then link the generic account token to the digital wallet account of user 110, by for example, linking the generic account token with the wallet ID of user device 120. Digital wallet server computer 140 may store the generic account token in digital wallet database 142 or may transmit the generic account token over network 130 to user device 120, where it stored in the memory of user device 120. User 110 may use the generic account token to conduct transactions through an interface provided by the digital wallet application stored on user device 120 or by a website associated with digital wallet server computer 140. The interface may comprise a visual representation of at least a portion of the account information entered by user 110, which is displayed using the display of user device 120. For example, the interface may comprise the last four characters of an account identifier associated with portable device 112 or may comprise an image of portable device 112 which user 110 may select when conducting a transaction. The generic account token may be requested by token provider server computer 160 to conduct a transaction with a resource provider. In one embodiment, digital wallet server computer 140 does not call out to token provider server computer 160 for a generic account token and may instead store the account identifier in digital wallet database 142. For example, digital wallet server computer 140 may store the account identifier in digital wallet database 142 in the form of a cryptographic pattern or encrypted data through the use of cryptographic algorithms and keys.

User 110 may enter account information or account data into user device 120 for any number of accounts that he or she wishes to conduct transactions with using any number of portable devices. The entered account information for each of these accounts or tokens that represent the entered account information may be stored in user device 120 and/or digital wallet database 142 and linked to the created account (e.g. digital wallet account) for user 110 or user device 120.

Once user 110 has entered data for all accounts with which he or she wishes to conduct transactions with, user 110 may wish to link the account data to a resource provider specific token that can be used to conduct a transaction with a specific resource provider. User 110 may generate a request for the resource provider specific token which may comprise a resource provider identifier such as a merchant name or merchant ID, an account selection identifying account information entered by user 110 such as the account identifier or account name, as well as a wallet ID identifying a digital wallet account created by digital wallet server computer 140 for user 110 or for user device 120. The account selection may be a user selectable indication that is linked to account data stored in digital wallet database 142 or in user device 120. The request may be generated using the interface provided by a digital wallet application stored on user device 120 or website associated with digital wallet server computer 140. For example, the interface may display a list of merchant names that user 110 may select and then assign to account information stored in the digital wallet using an "add" button adjacent to a visualization of the account selection. In another embodiment, user 110 could enter the name of the resource provider into a text field, and digital wallet server computer 140 could query a database for a resource provider identifier associated with the entered text. The resource provider identifier may comprise a merchant ID, merchant name, address, or any other identifying information. In such an embodiment, the resource provider identifier could be displayed to user 110 for confirmation, before allowing user 110 to assign the resource provider identifier to account information stored in the digital wallet.

Once the request for the resource provider specific token comprising the resource provider identifier, account selection, and wallet ID has been generated, the request is transmitted by user device 120 over network 130 and received by digital wallet server computer 140. Digital wallet server may then identify the wallet ID in the request and query digital wallet database 142 for the digital wallet account associated with the wallet ID. Digital wallet server computer 140 may then create an entry for a resource provider specific token linked to the wallet ID in digital wallet database 142, wherein digital wallet server computer 140 extracts the resource provider identifier and account selection from the request and stores them in digital wallet database 142. Digital wallet server computer 140 may then send the request over processing network 150 to token provider server computer 160. Token service 162 receives the request and then retrieves a resource provider specific token from token vault 164 and records that the retrieved token is associated with digital wallet server computer 140. The resource provider specific token is then sent over processing network 150 to digital wallet server computer 140. Digital wallet server computer 140 then links the resource provider specific token with the resource provider identifier and account selection in digital wallet database 142. The resource provider specific token may further be linked to user details associated with the wallet ID and/or digital wallet account of user 110 such as user name, device information, shipping address, etc. The digital wallet server computer then sends the resource provider specific token over network 130 to user device 120 where it is displayed or stored by user device 120. In one embodiment, the resource provider specific token is a number that is of the same length and form as a real account number. For example, the resource provider specific token can be a string of characters, such as a sixteen digit credit card number and/or CVV2 value. In some embodiments, the resource provider specific token may only be successfully used with a specific resource provider.

User 110 may request a plurality of resource provider specific tokens for a plurality of resource providers. The plurality of resource provider specific tokens may be stored in digital wallet database 142 and/or user device 120. The plurality of resource provider specific tokens may be displayed to user 110 using an interface (provided by a digital wallet application or a website associated with digital wallet server computer 140). In one embodiment, the user may use the interface to change the assignment of which account datum is linked with each resource provider specific token. For example, a "move" option could be provided by the interface, in which a user could drag a visualization of at least a portion of a resource provider specific token or of at least a portion of an account identifier to communicate an account selection associated with a resource provider specific token. In such an embodiment, the resource provider identifier, account selection, and wallet ID may be sent in an update request to digital wallet server computer 140 which may be received by digital wallet server computer 140 and compared to data stored in digital wallet database 142. Digital wallet server computer 140 would then update digital wallet database 142 by first, identifying the resource provider specific token linked to the received wallet ID and resource provider identifier, unlinking any existing account selection linked to the resource provider specific token, and then linking the resource provider token to the received account selection. As such, user 110 need not log into numerous resource provider accounts to update account data used for transactions (e.g., automatic payments), nor is user 110 required to continuously enter sensitive account information into numerous entries in order to update account data stored by each resource provider.

Figure 2:
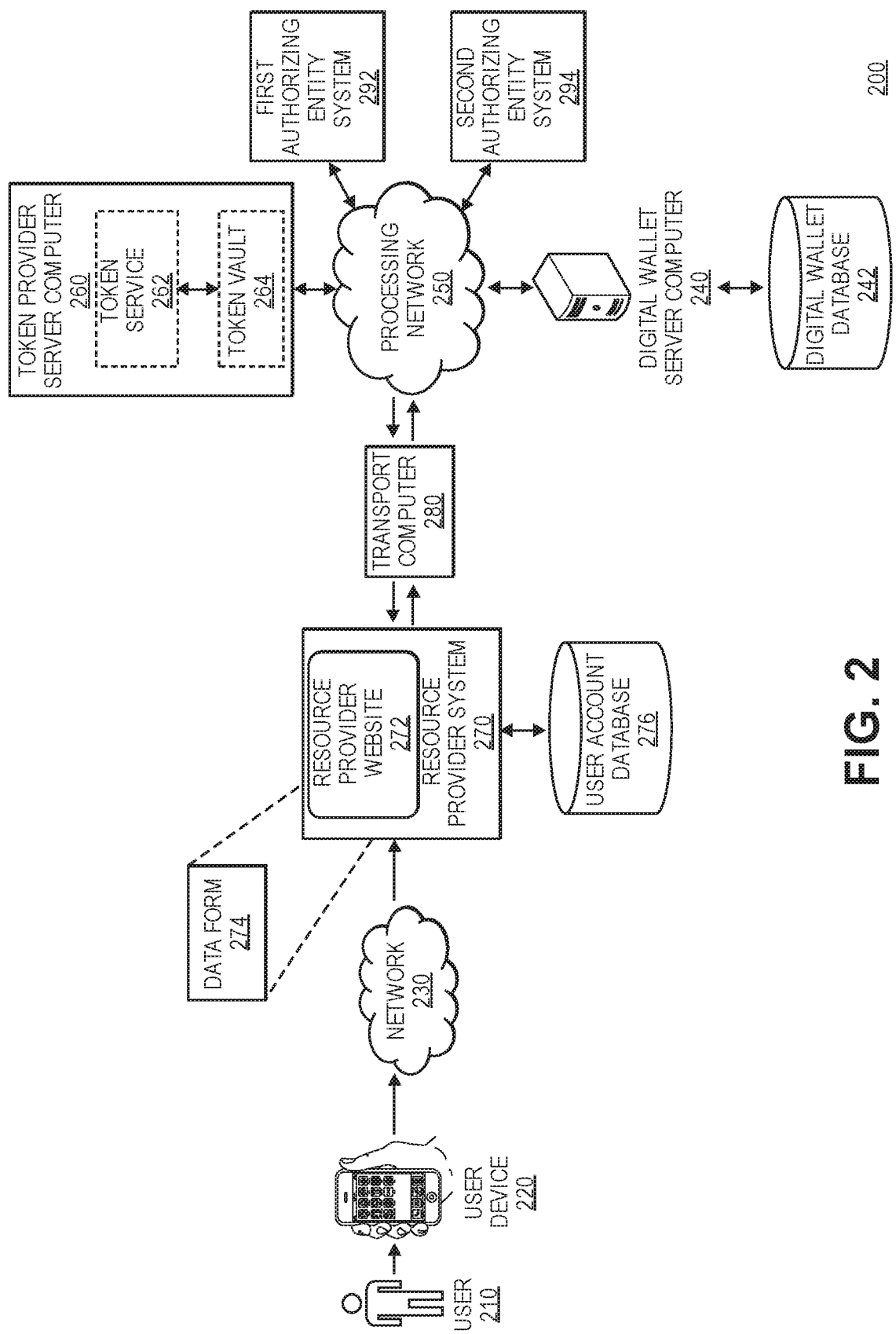
FIG. 2 shows a diagram of a system for conducting a transaction using a resource provider specific token according to embodiments of the invention.

FIG. 2 illustrates a method and system 200 according to an embodiment of the invention. The method and system 200 can be used to conduct a transaction with a resource provider using a resource provider specific token.

System 200 comprises user 210, user device 220, network 230, digital wallet server computer 240, digital wallet database 242, processing network 250, token provider server computer 260, token service 262, and token vault 264, which may be the same as the respective entities shown in FIG. 1 described above. System 200 further comprises a resource provider system 270, which may be a system comprising servers, computers, server computers, databases, and/or access devices belonging to a resource provider such as a merchant. The resource provider system 270 may comprise a resource provider website 272. The resource provider website 272 may comprise a data form 274 (e.g. payment form), which may be a form consisting of text fields for entering account data. System 220 also comprises of a user account database 276, transport computer 280, and a plurality of authorizing entity systems such as first authorizing entity system 292 and second authorizing entity system 294. First authorizing entity system 292 and second authorizing entity system 294 may each comprise server computers and databases used to authorize transactions by a first authorizing entity and second authorizing entity respectively.

A method according to an embodiment of the invention can be described with respect to system 200. The method may begin with user 210 obtaining a resource provider specific token stored or displayed on user device 220. The resource provider specific token may be obtained by user 210 according to system 100 of FIG. 1 described above. User 210 and/or user device 220 may then establish a connection with resource provider system 270, by for example, connecting over network 230. In one embodiment, user 210 and user device 210 may establish a connection with resource provider system 270 through an access device, such as a point-of-sale terminal at a merchant. For example, user 210 may use a contactless element in user device 220 to interact with a contactless reader in an access device of resource provider system 270. In another embodiment, user 210 may establish a connection with resource provider system 270 via the Internet in an e-commerce transaction.

Once user 210 and/or user device 220 has established a connection with resource provider system 270, user 210 may transmit or cause the transmission of the resource provider specific token to resource provider system 270. In one embodiment, the resource provider specific token may be a string of characters of the same form and length of a real account number and user 210 may transmit the resource provider specific token to resource provider system 270 by entering the string of characters into data form 274 provided by resource provider website 272 or provided by a third-party in communication with resource provider website 272 and/or resource provider system 270. Data form 274 may contain additional text fields in which user 210 may enter user details such his or her name, shipping address, telephone number, etc. Data form 274 may also comprise text fields or selections regarding the management of automatic transactions. For example, data form may comprise text fields for a payment amount and a payment date that can be used to conduct transactions on a monthly basis using account data entered by user 210. In one embodiment, the resource provider token and user details may be auto-filled into data form 274 by user device 220.

Once resource provider system 270 has received the resource provider specific token from user 210 and/or user device 220, resource provider system 270 may store the resource provider specific token along with any user details entered by user 210 in user account database 276 for use in a transaction or for use in automatic transactions. In one embodiment, resource provider system 270 does not store the resource provider specific token to conduct a transaction, and instead stores a transaction ID which may be referenced to the resource provider specific token by a third-party. After the resource provider specific token and user details have been stored in user account database 276, user 210 and/or user device 220 may terminate the established connection with resource provider system 270.

To conduct a transaction or automatic transactions according to system 200, resource provider system 270 may generate an authorization request comprising transaction data such as a transaction amount, a resource provider identifier specific to the resource service provider (e.g. merchant ID), and account data comprising data entered into data form 274 by user 210 or user device 220 including the resource provider specific token and user details. The authorization request is sent to transport computer 280, which then forwards the authorization request to processing network 250. Processing network 250 recognizes that the account data contained in the authorization request comprises a token, and forwards the authorization request to token provider server computer 260. Token provider server computer 260 receives the authorization request and may communicate with token vault 264 to determine an account linked to the token contained in the request. Token service 262 may receive, from token vault 264, an account identifier and an identifier for the entity that issued the account. From the received identifiers, token service 262 may determine that the account is a resource provider specific token managed by digital wallet server computer 240. The token service 262 may then send the authorization request, comprising the resource provider specific token, for account details or account data associated with the resource provider specific token to digital wallet server computer 240 through processing network 250. Digital wallet server computer 240 receives the request and queries digital wallet database 242 for account data linked to the resource provider specific token such as a wallet ID, resource provider identifier, real account number (or a generic account token associated with the real account number), and user details such as a name and shipping address. The account data is then placed in the authorization request and sent back to token service provider server computer 260 over processing network 250 by digital wallet server computer 240.

After receiving the authorization request comprising the account data, token service 262 validates the authorization request by comparing the account data received from digital wallet server computer 240 (i.e. resource provider identifier and user details) with the account data and transaction data received from the resource provider system. If the separately received data match, the authorization request is validated. For example, token service 262 may compare a merchant ID linked to the resource provider specific token to the merchant ID of resource provider system 270 (as received in the authorization request). In addition, token service 262 may compare a shipping address entered by user 210 into data form 274 to the shipping address associated with the wallet ID and resource provider specific token. If the shipping addresses match, token service 262 can be sure that user 210 is not a fraudulent actor attempting to fraudulently make purchases online and may therefore validate the authorization request. Otherwise, token service 262 may not validate the authorization request and may send the authorization request to processing network 250, which declines the transaction and sends an authorization response containing an indication of decline back to the resource provider system 270 via transport computer 280.

Although many specific functions are described above as being performed by the token provider server computer, such functions may be performed by the processing network and/or the digital wallet server computer in other embodiments of the invention.

Upon validation of the authorization request, token service 262 may replace the resource provider token in the authorization request with a real account number. The real account number may be retrieved from account data received from digital wallet server computer 240 or may be retrieved from token vault 264 based on account data received from digital wallet server computer 240. For example, token service 262 may receive a generic account token linked to the resource provider specific token and may call out to token vault 264 to retrieve the real account number associated with the generic account token. Token provider server computer 260 may then transmit the authorization request to processing network 250, which then forwards the request to an issuer of the real account number such as first authorizing entity system 292. First authorizing system 292 may then approve or decline the transaction based on a variety of factors such as availability of funds and assessed risk of the transaction. First authorizing system 292 may then submit the approval or decline along with the real account number in an authorization response to processing network 250. Processing network 250 may then communicate with token provider server computer 260 to exchange the real account number with the resource provider specific token in the authorization response. The authorization response may then be sent to transport computer 280, which may keep a record of the approval or decline and then submit the authorization response to resource provider system 270 so that the resource provider may receive the result of the authorization request and respond accordingly. If the authorization response contains an indication of transaction approval, resource provider system 270 may store the resource provider token in user account database 276. Resource provider system 270 may later access the resource provider token from user account database 276 to conduct subsequent automatic transactions in the same manner described above.

According to an embodiment of the invention, if user 210 wishes to update account data linked to the resource provider token, user 210 may utilize a digital wallet application stored in the memory of user device 220 or a website associated with digital wallet server computer 240 to generate update requests to digital wallet server computer 240 according to FIG. 1 described above. For example, user 210 may request that the resource provider token be linked to an account issued by second authorizing entity system 294. Upon receiving the appropriate requests from user 210, digital wallet server computer 240 may update digital wallet database 242 accordingly. During an automatic transaction, resource provider website may retrieve the resource provider specific token from user account database 276. Resource provider system may then submit an authorization request comprising the resource provider specific token to processing network 250 via transport computer. Processing network 250 may then forward the authorization request to token service provider computer 260. Token service 262 may then recognize that the resource provider token is managed by digital wallet server computer 240 and may send the authorization request to digital wallet server computer 240 over processing network 250. Digital wallet server computer 240 again compares the resource provider token to linked account data stored in digital wallet database 242. However, the digital wallet database 242 has now been updated such that the resource provider token is linked to a different account data than before, such as an account issued by second authorizing entity system 294. Digital wallet server computer 240 may then send the authorization request comprising the resource provider token and account data to token server provider computer 260. Token service 262 may validate the authorization request according to the method described above and may exchange the resource provider specific token in the authorization request with a real account number for the account issued by authorizing entity system 294. The authorization request may then be sent, via processing network 250, to second authorizing entity system 294, which may approve or decline the transaction and generate an authorization response comprising the real account number. The authorization response may then be sent to processing network 250, which communicates with token provider server computer 260 to exchange the real account number with the resource provider specific token. The authorization response is then sent back to the resource provider system via transport computer 280.

The resource provider system 270 can then confirm that the resource provider token was successfully used to conduct the automatic transaction based on the authorization response. Resource provider system 270 is unaware of what accounts are linked to the resource provider specific token in digital wallet database and may only see that the resource provider specific token is valid. As such, user 210 need not continuously enter sensitive account information into data form 274 to update his or her account data and manage automatic transactions. Furthermore, user 210 is able to update account data stored by a multitude of resource provider systems without having to establish a connection with each and every resource provider system. User 210 may simply update account data linked to a resource provider token by communicating with digital wallet server computer 240 according to FIG. 1 described above, and may do so for a plurality of resource provider specific tokens stored by a plurality of resource provider systems. Thus, data used to conduct transactions by a resource provider system may be updated in a manner that is more time-efficient and less susceptible to potential data interception attempts than in prior art. Furthermore, the method according to system 200 does not require resource provider system 200 to integrate with digital wallet server computer 240, as tokens are managed between token provider server computer 260 and digital wallet server computer 240.

FIG. 3 illustrates an example of a database table managed by a server computer, such as digital wallet server computer 140 of FIG. 1 and/or digital wallet server computer 240 of FIG. 2 to link account information to a resource provider token.

The entries into database 300 may include entries for a resource provider specific token 310, entries for a merchant ID 320 linked to each resource provider specific token, as well as a creation date for each resource provider specific token. Each resource provider specific token may also be linked to entries for a wallet ID 330 identifying the user and/or device that requested the creation of each resource provider specific token as well as entries for other user details 340 such as a user name and shipping address (or any other suitable user details). Database 300 additionally comprises entries for account information 350 (e.g. account name, PAN, CVV2, billing address, etc.), which may be updated and linked and unlinked to a virtual payment account according to any of the above methods. Database 300 may also comprise an entry for the date of last update 360, in which digital wallet server computer 140 and/or digital wallet server computer 240 may record the last time an entry linked to a resource provider specific token was updated.

According to embodiments of the invention, a user may use an interface of a digital wallet to manage account data used for conducting transactions at a specific resource provider or merchant. The user may manage account data by sending an update request comprising a merchant ID, wallet ID, and an account selection. A digital wallet server computer may then receive the request and query database 300 for an entry 330 containing a wallet ID that matches the wallet ID contained in the update request. The digital wallet server computer may identify the entry for the merchant ID 320 that is linked to the wallet ID and that matches the merchant ID contained in the update request. The digital wallet server computer may then unlink the entries for the account information 350 linked to the corresponding resource provider specific token entry 310 and may then link account information corresponding to the account selection received in the update request to the resource provider specific token entry 310.

For example, user John Smith may wish to change the account data linked to the resource provider token that he uses at Best Buy. A digital wallet server computer may receive an update request from user John Smith, which may comprise data such as "wallet ID=47321," "merchant ID=Best Buy," and "Account Name=Chase Freedom." The digital wallet server computer may then identify a wallet ID entry 330 that matches the wallet ID for John Smith's user device by querying database 300 for "wallet ID=47321". The digital wallet server computer may then identify the resource provider specific token that is to be updated by querying the merchant ID entries 320 linked to the identified wallet ID entry 330 for "merchant ID=Best Buy". The digital wallet server computer may then read the resource provider specific token in entry 310 (i.e. "resource provider specific token= . . . 4321") as well as the account name linked to the resource provider specific token in entry 350. The digit wallet server may then unlink the account name currently linked to the resource provider specific token (i.e. "account name=AMEX GOLD") as well as the other account information associated with "AMEX GOLD" (e.g. PAN, CVV2, billing address) from the resource provider specific token. The digital wallet server may then query the entries linked to the wallet ID for an entry that matches "account name=Chase Freedom" and may then change the linkage for the resource provider token in the entry for the account name 350 to "Chase Freedom" as well as the other account information associated with "Chase Freedom" such as the PAN, CVV2, and billing address. The digital wallet server computer may then change the entry for "last update" 360 linked to the resource provider specific token to the current date and time. The changes made by the digital wallet server computer to database 300 may be displayed to user John Smith using an interface of the digital wallet.

Figure 4:
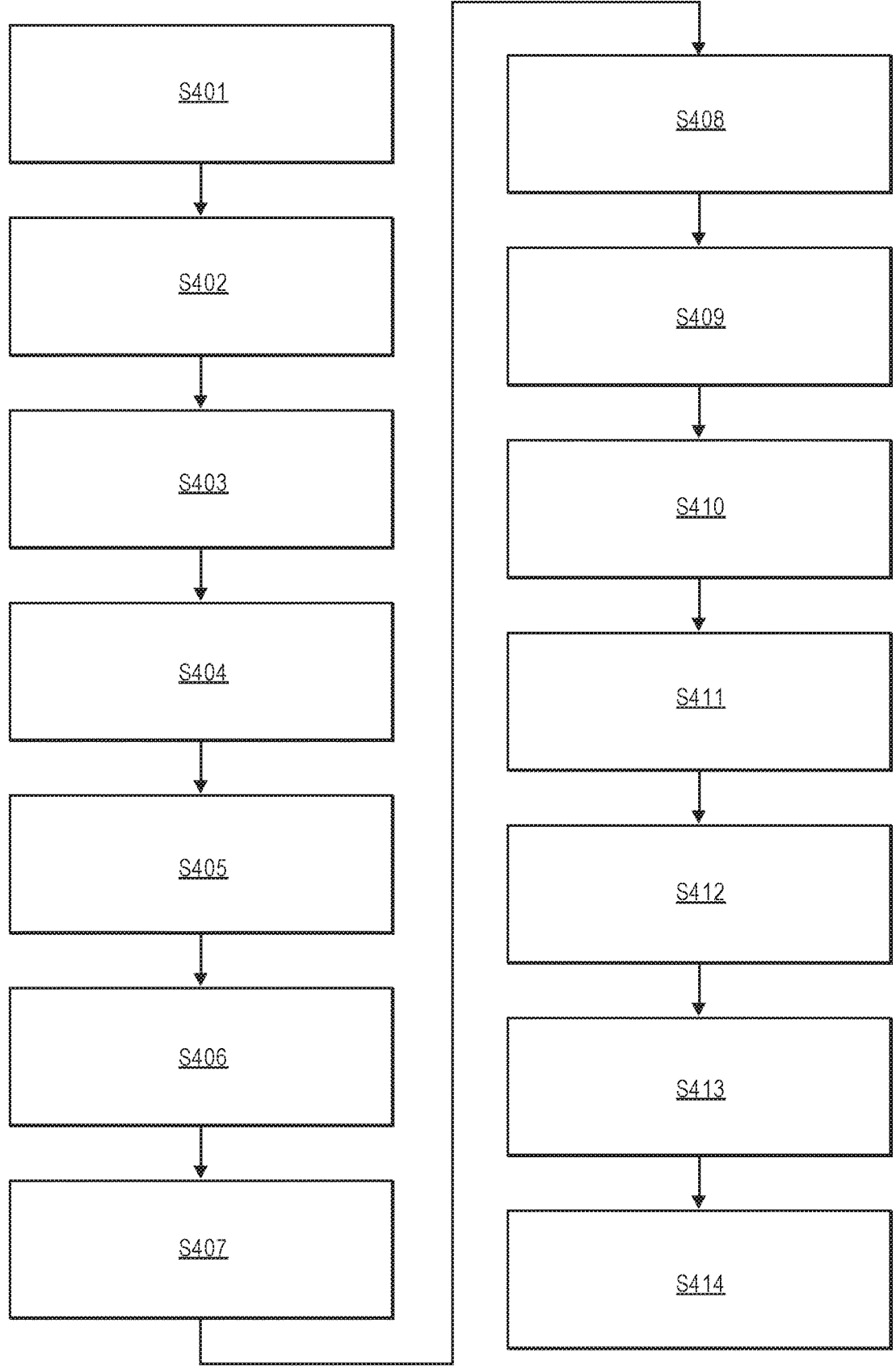
FIG. 4 shows a method for creating and using a resource provider specific token in a transaction according to an embodiment of the invention.

FIG. 4 shows a method for generating and using a resource provider specific token. In step S401, a user utilizes a user device to select a merchant name or merchant ID and select account data stored in a digital wallet such as an account selection of an account or generic account token identified by a specific account name. In step S402, the user sends a request for the creation of a resource provider specific token containing a wallet ID, merchant ID, and account selection to a digital wallet server. In step S403, the digital wallet server computer receives the request and extracts the merchant ID, wallet ID, and account selection from the request and requests a resource provider specific token from a token provider. In step S404, digital wallet server computer receives the resource provider specific token from the token provider and links or associates it with the wallet ID, merchant ID, and account selection received from the user.

In step S405, the digital wallet server computer maintains a record of the association in a digital wallet database. In step S406, the digital wallet server sends or displays the resource provider specific token to the user. In step S407, the user uses the resource provider specific token in place of a real account number at a merchant website to pay for a good or service. In step S408, the merchant computer sends an authorization request message containing the resource provider specific token and transaction details to a processing network via a transport computer. In step S409, the processing network sends the resource provider specific token to a token provider, which recognizes that the resource provider specific token is managed by the digital wallet server computer. In step S410, the token provider requests, from the digital wallet server computer, the account data and merchant ID linked to the resource provider specific token as well as any wallet user details.

In step S411, the digital wallet server computer queries the digital wallet database for the requested information and transmits the information in a response to the token provider. In step S412, the token provider receives the response and validates the virtual payment account by comparing information received from the digital wallet server computer to information received from the merchant computer to determine a match. Matches between two sets of information may be determined, by the token provider during validation, by comparing a string of characters representing each set of information, and matching each individual character between the two sets of information in order. A comparison may be considered a match, if the number of character mismatches is below a predetermined threshold. For example, the token service may compare a merchant ID received from the digital wallet server computer to the merchant ID of the merchant requesting authorization. If the merchant IDs match, then the resource provider specific token may be validated. The token provider may also compare a shipping address associated with the wallet ID linked to the resource provider specific token to a shipping address received from the merchant computer in the authorization request, and may choose to validate the resource provider specific token depending on a match. Furthermore, the token provider may conduct a risk analysis assessing the likelihood of fraud associated with received information in a transaction and may determine a risk score for the transaction based on the risk analysis.

In step S413, the token service replaces the resource provider specific token in the authorization request message with a real payment account number retrieved from either the digital wallet database or from a token vault and sends the authorization request to the authorizing entity or issuer of the real payment account number. In step S414, the authorizing entity authorizes the transaction and sends an authorization response with the real payment account number through a secure authorization channel such as through the processing network. The processing network may communicate with the token provider to replace the real payment account number in the authorization response with the resource provider specific token. The authorization response may then be sent back to the merchant computer through a transport computer or acquiring entity of the merchant.

Figure 5:
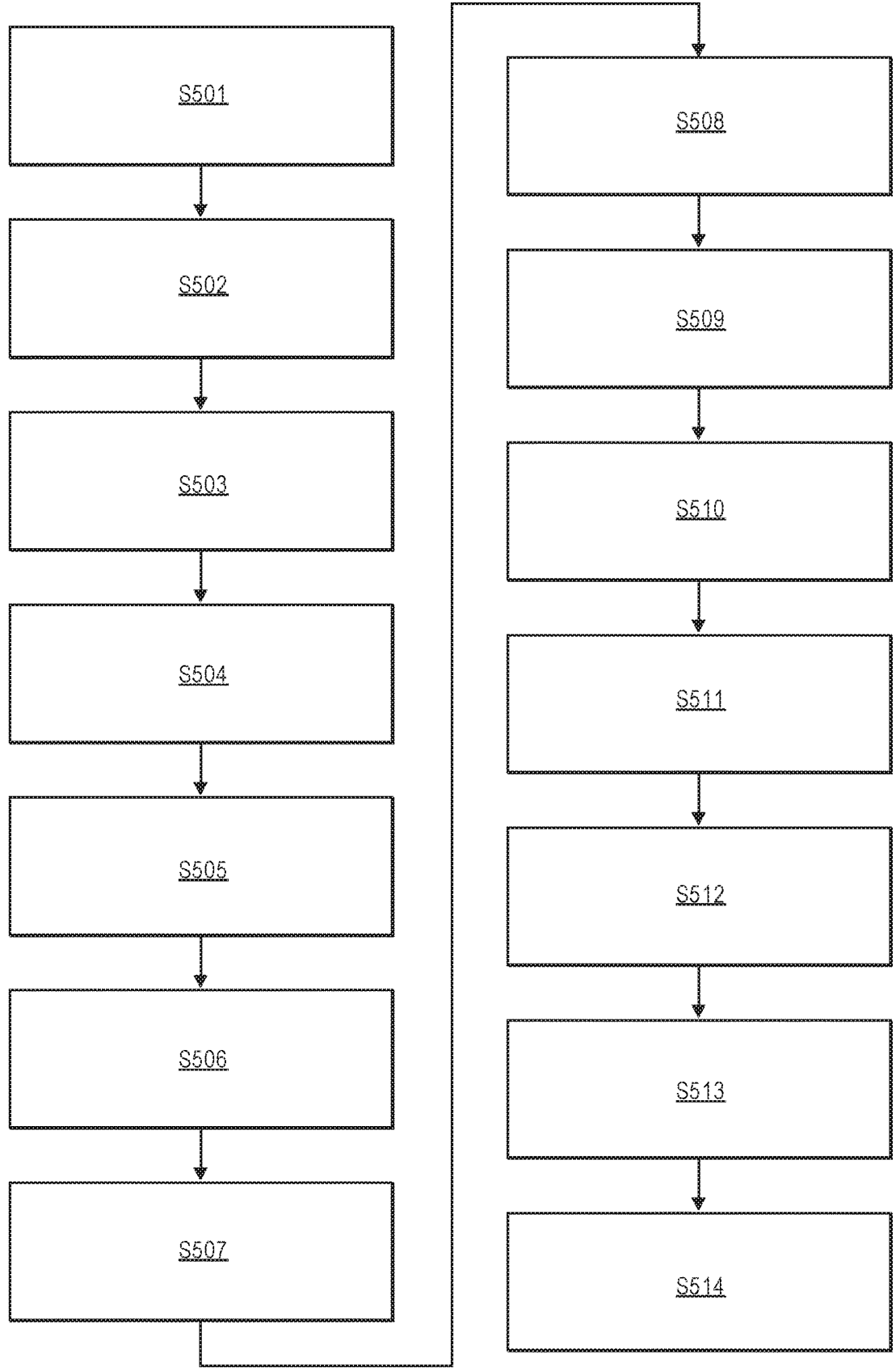
FIG. 5 shows a method for updating and using a resource provider specific token in a transaction according to an embodiment of the invention.

FIG. 5 shows a method for updating account information linked to a resource provider specific token to conduct a transaction. In step S501, a user utilizes an interface provided by a digital wallet to associate a resource provider specific token stored in the digital wallet to account data stored in the digital wallet. In step S502, a request for an update of account information linked to the resource provider specific token containing a wallet ID, merchant ID, and an account selection is sent to a digital wallet server computer. In step S503, the digital wallet server computer receives the request and queries a digital wallet database for the resource provider specific token that is linked to both a wallet ID and merchant ID that matches the wallet ID and merchant ID contained in the update request.

In step S504, the digital wallet server computer determines account information linked to the resource provider specific token and unlinks it from the resource provider specific token. In step S505, the digital wallet server computer links the resource provider specific token to the account information that matches the account selection received in the update request. For example, the digital wallet server computer may unlink the resource provider specific token to account information associated with "AMEX GOLD" and may then link the resource provider specific token to account information associated with "CHASE FREEDOM." In step S506, the digital wallet server computer sends or displays resource provider specific token update to the user. In step S507, the merchant computer accesses the resource provider specific token from a user account database to conduct a transaction. The transaction may be an automatic transaction that was scheduled by the user to occur for a regularly occurring date and amount.

In step S508, the merchant computer sends the authorization request message containing the resource provider specific token and transaction details to a processing network via a transport computer or an acquiring entity of the merchant. In step S509, the processing network sends the resource provider specific token to a token provider which recognizes that the resource provider specific token is managed by the digital wallet server computer. In step S510, the token provider requests the account data and merchant ID linked to the resource provider specific token as well as any wallet user details from the digital wallet server computer. In step S511, the digital wallet server computer queries the digital wallet database for the requested information and transmits the information to the token provider. For example, the digital wallet server computer may query the digital wallet database and may determine that the resource provider token is now linked to account information associated with "CHASE FREEDOM" and a Merchant ID associated with "Best Buy" and may transmit the account information and Merchant ID to the token provider. In step S512, the token provider validates the resource provider token by comparing data received from the digital wallet server computer to data received from the merchant computer. For example, the token provider may compare the merchant ID linked to the resource provider specific token tot the merchant ID of the merchant computer. In addition, the token provider may compare a shipping address linked to the wallet ID associated with the resource provider specific token to a shipping address received from the merchant computer. If the shipping addresses match, the token provider may have greater confidence that the transaction should be validated. If the shipping addresses do not match, the token provider may determine that the user conducting the transaction is not the same as the user linked to the resource provider specific token and may choose not to validate the transaction.

In step S513, the token service sends the real account number associated with the resource provider token or associated with a generic account token linked to the resource provider token to the authorizing entity or issuer of the real account number in the authorization request. In step S514, the authorizing entity approves or declines the transaction in an authorization response containing the real account number. The authorization response is sent to the processing network, which communicates with the token provider to replace the real account number with the resource provider specific token in the authorization response. The processing network then sends the authorization response to the merchant computer via a transport computer or acquiring entity of the merchant.

Figure 6:
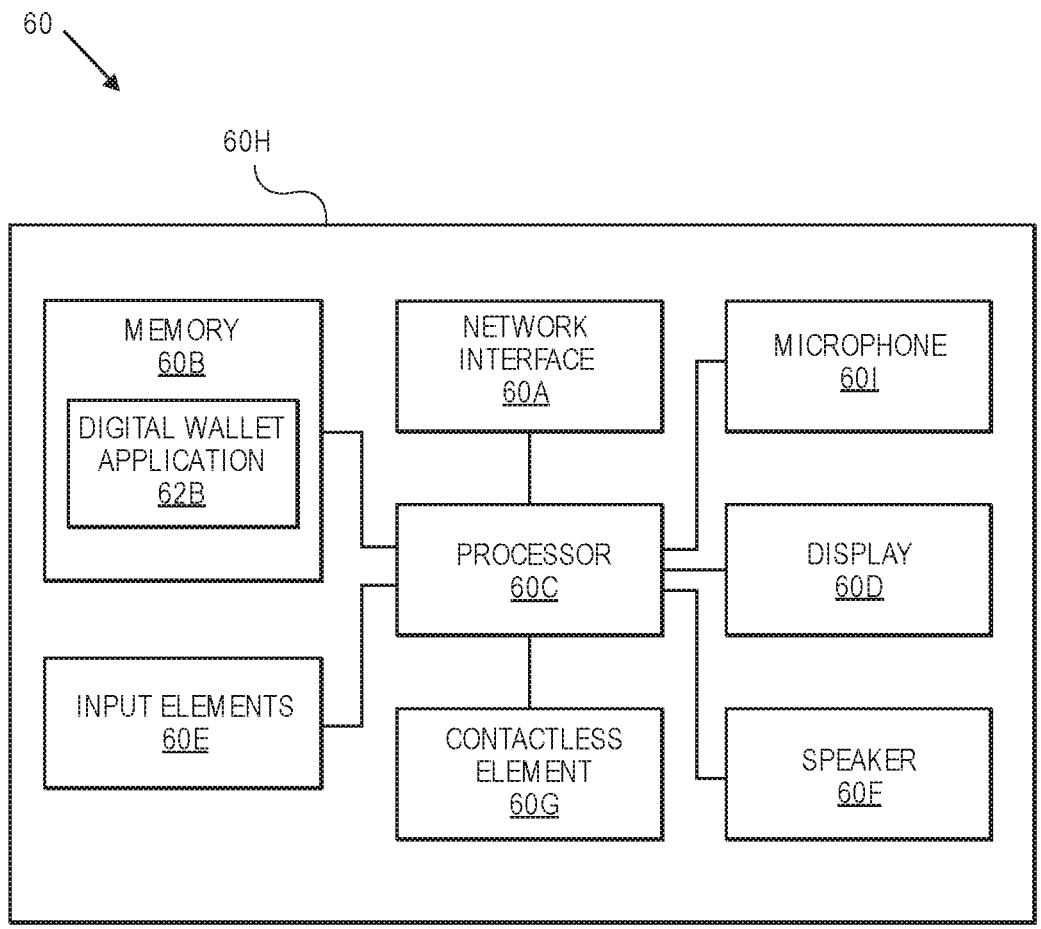
FIG. 6 shows a block diagram of an exemplary user device according to embodiments of the invention.

FIG. 6 shows a block diagram of an exemplary user device according to embodiments of the invention. The exemplary user device 60 may comprise a processor 60C (e.g., a microprocessor) for processing the functions of the user device 60. The user device 60 may also include a network interface 60A for wireless data transfer (e.g., data transmission). The user device 60 may further comprise a memory 60B, for storing data, that can be present within the body 60H of the user device 60. The memory 60B may comprise a computer readable medium to store a method executable by processor 60C. The memory 60B may further comprise applications such as digital wallet application 62B for storing data and receiving, generating, and sending commands between a user and a server computer. In some cases, the memory 60B may also store information such as access data or account data. In general, any of this information may be transmitted by the user device 60 to another device, using any suitable method, including the use of the network interface 60A or a contactless element 60G. The body 60H may be in the form of a plastic substrate, housing, or other structure.

In some embodiments, the contactless element 60G, which is typically implemented in the form of a semiconductor chip (or other data storage element) with an associated wireless transfer (e.g., data transmission) element, such as an antenna. Contactless element 60G may be coupled to (e.g., embedded within) the user device 60 and data or control instructions that are transmitted via a network may be applied to the contactless element 60G by means of a contactless element interface. The contactless element 60G may be capable of transferring and receiving data using a short range wireless communication capability. As noted above, the user device 60 may comprise components to both be the interrogator device (e.g. receiving data) and the interrogated device (e.g. sending data). Thus, the user device 60 may be capable of communicating and transferring data or control instructions via both cellular network (or any other suitable wireless network—e.g. the Internet or other data network) and short-range communications.

The user device 60 may also comprise a display 60D to allow a user to see information and messages. The user device 60 may further include input elements 60E to allow a user to input information into the device, a speaker 60F to allow the user to hear voice communication, music, etc., and a microphone 60I to allow the user to transmit his or her voice through the user device 60.

Figure 7:
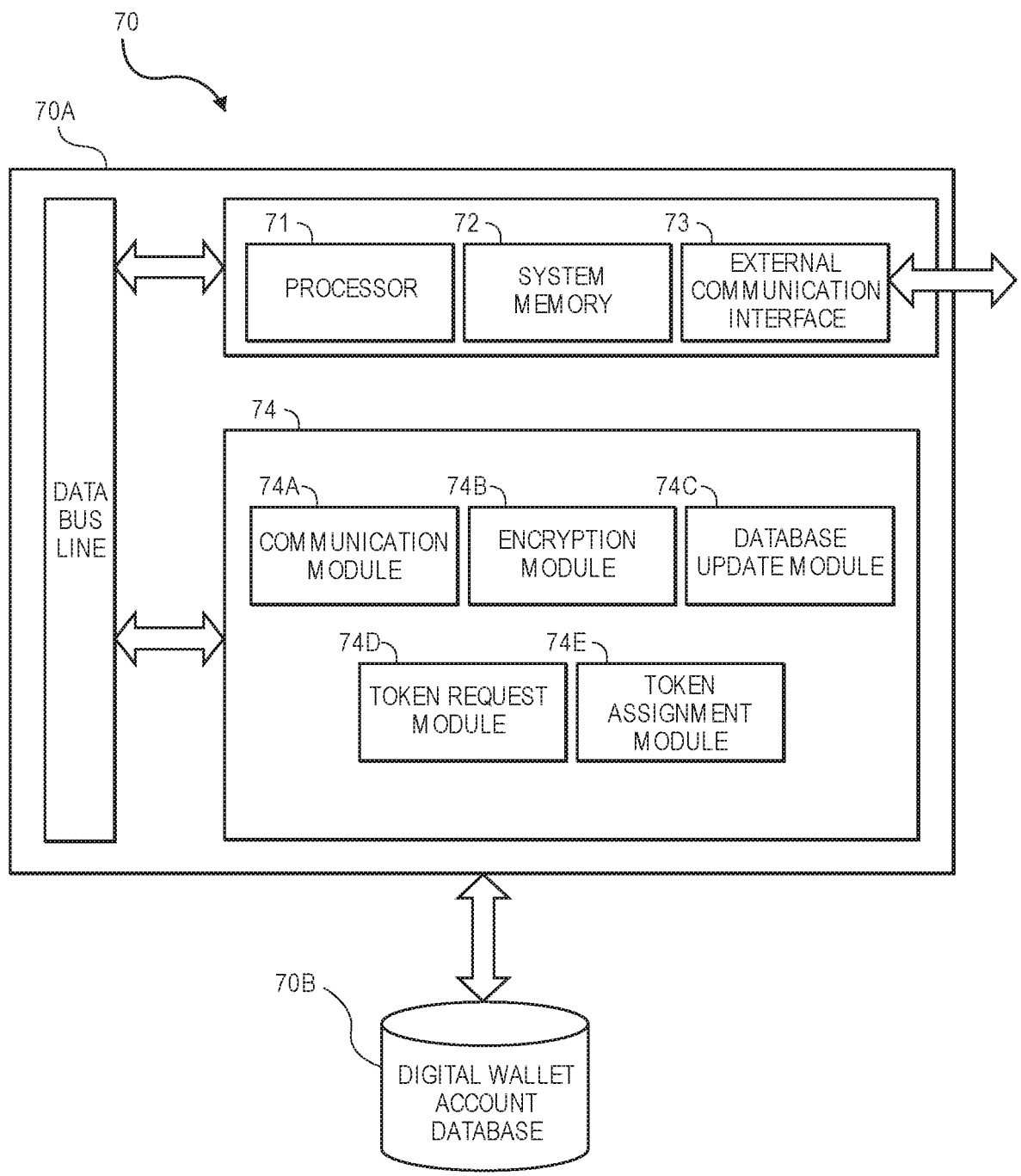
FIG. 7 shows a block diagram of an exemplary digital wallet server computer according to embodiments of the invention.

FIG. 7 shows a block diagram of a digital wallet server computer according to embodiments of the invention. The digital wallet server computer 70 comprises a server computer 70A and a digital wallet database 70B coupled to the server computer 70A.

The digital wallet account database 70B may store created accounts such as digital wallet accounts of various users that are affiliated with the digital wallet and associated with the digital wallet server computer. For example the digital wallet account database 70B may comprise a wallet ID for the user as well as a username, password, any other authentication information (biometrics, PINs, email), payment account information, tokens, user details, etc.

The digital wallet account database 70B (as well as any other database described herein) may be a conventional, fault tolerant, relational, scalable, secure database such as Oracle™ or Sybase™. The digital wallet account database 70B may be implemented using various standard data-structures, such as an array, hash, (linked) list, structured text file (e.g., XML), table, and/or the like. Such data-structures may be stored in memory and/or in (structured) files.

The server computer 70A may comprise a processor 71 for executing commands and instructions, which may be coupled to a system memory 72 and an external communication interface 73. The processor 71 may further be operatively coupled to a computer-readable medium 74 storing modules and methods executable by the processor 71.

The computer-readable medium 74 may comprise a number of software modules including a communication module 74A, an encryption module 74B, a database update module 74C for creating and updating entries in the digital wallet account database 70B, a token request module 74D for requesting tokens from a token provider, and a token assignment module 74E for linking received tokens to entries in digital wallet account database 70B.

The communication module 74A may comprise code that causes the processor 71 to generate messages, forward messages, reformat messages, and/or otherwise communicate with other entities.

The encryption module 74B may include any suitable encryption algorithms to encrypt data in embodiments of the invention. Suitable data encryption algorithms may include DES, triple DES, AES, etc. It may also store encryption keys that can be used with such encryption algorithms. The encryption module 74B may utilize symmetric or asymmetric encryption techniques to encrypt and/or verify data.

Figure 8:
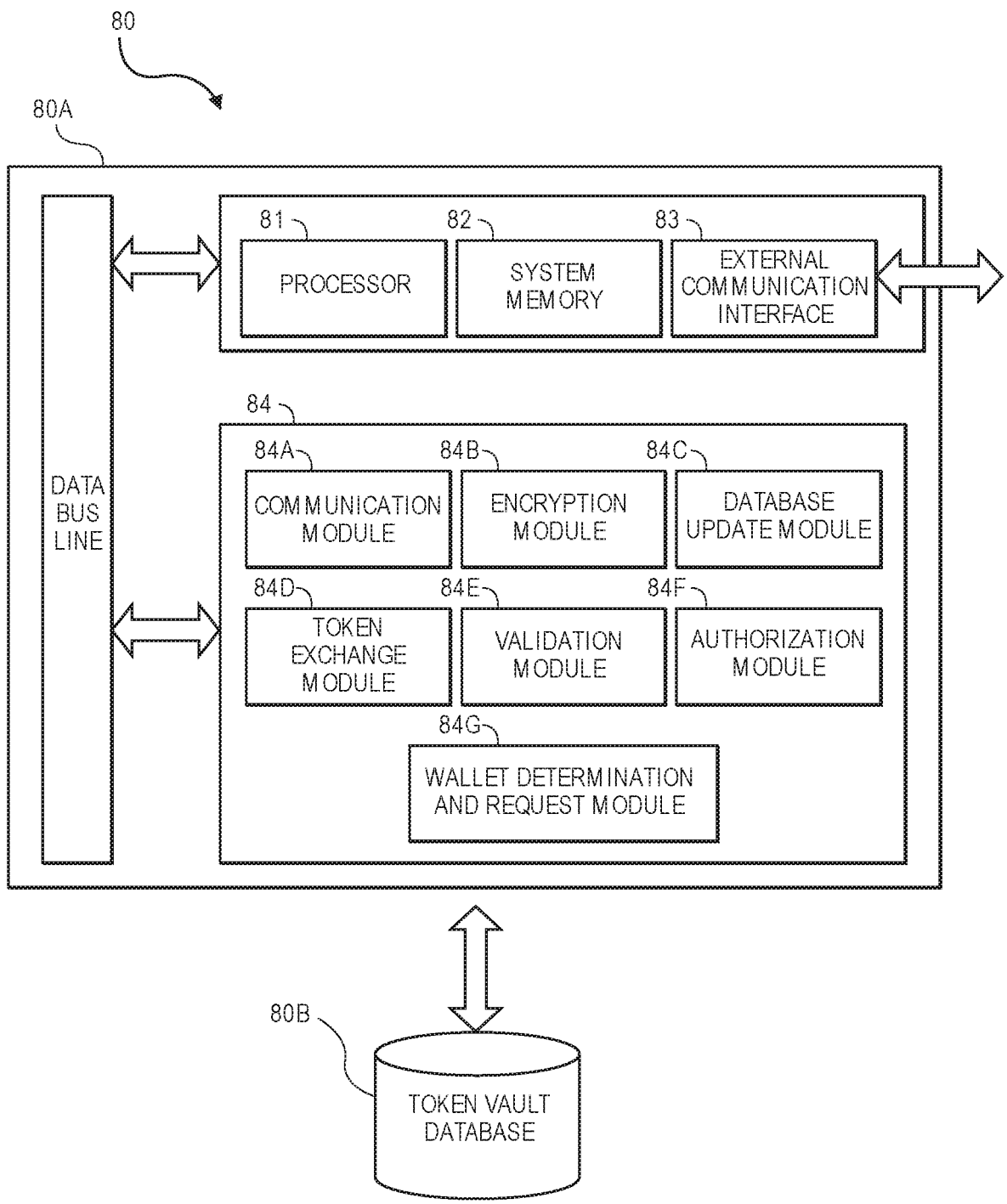
FIG. 8 shows a block diagram of an exemplary token provider server computer according to embodiments of the invention.

FIG. 8 shows a block diagram of a token provider server computer according to embodiments of the invention. The token provider server computer 80 comprises a server computer 80A and a token vault database 80B. The token vault database 80B may comprise tokens for conducting transactions as well as account data linked to the tokens. Server computer 80A may update data in token vault database 80B using a database update module 84C. Server computer 80A may query, extract, and exchange data, such as token data and/or account data, from token vault database 80B using a token exchange module 84D.

The server computer 80A may further comprise a processor 81 for executing commands and instructions, which may be coupled to a system memory 82 and an external communication interface 83. The processor 81 may further be operatively coupled to a computer-readable medium 84 storing modules and methods executable by the processor 81.

The computer-readable medium 84 may comprise a number of software modules including a communication module 84A and an encryption module 84B. The communication module 84A may comprise code that causes the processor 81 to generate messages, forward messages, reformat messages, and/or otherwise communicate with other entities. The encryption module 84B may include any suitable encryption algorithms to encrypt data in embodiments of the invention. Suitable data encryption algorithms may include DES, triple DES, AES, etc. It may also store encryption keys that can be used with such encryption algorithms. The encryption module 84B may utilize symmetric or asymmetric encryption techniques to encrypt and/or verify data.

The computer-readable medium 84 may further comprise a wallet determination and request module 84G for determining a digital wallet provider associated with a resource provider specific token and requesting and receiving, from the digital wallet provider, account data linked to the resource provider specific token. For example, the wallet determination and request module may comprise instructions for requesting and receiving a merchant ID, an account identifier, and user details from the digital wallet provider.

The computer-readable medium 84 may further comprise a validation module 84E and an authorization module 84F. The validation module 84E may be used to validate an authorization request message based on information received from a resource provider system and from a digital wallet provider. For example, validation module 84E may comprise instructions for comparing a merchant ID and user details such as a shipping address received from a resource provider system in an authorization request comprising a resource provider specific token, to a merchant ID and shipping address that are received from a digital wallet provider and linked to the resource provider specific token. The authorization module 84F may comprise instructions for receiving, generating, formatting, and sending authorization request messages and authorization response messages. For example, the authorization module 84f may comprise instructions for sending an authorization request message to a processing network such as a payment processing network or to an issuer of an account or other authorizing entity during a transaction and for receiving an authorization response message indicating approval or decline of the transaction.

In some embodiments, the payment processing network may include data processing subsystems, networks, and operations used to support and deliver authorization services, exception file services, transaction scoring services, and clearing and settlement services. An exemplary transaction processing system may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Figure 9:
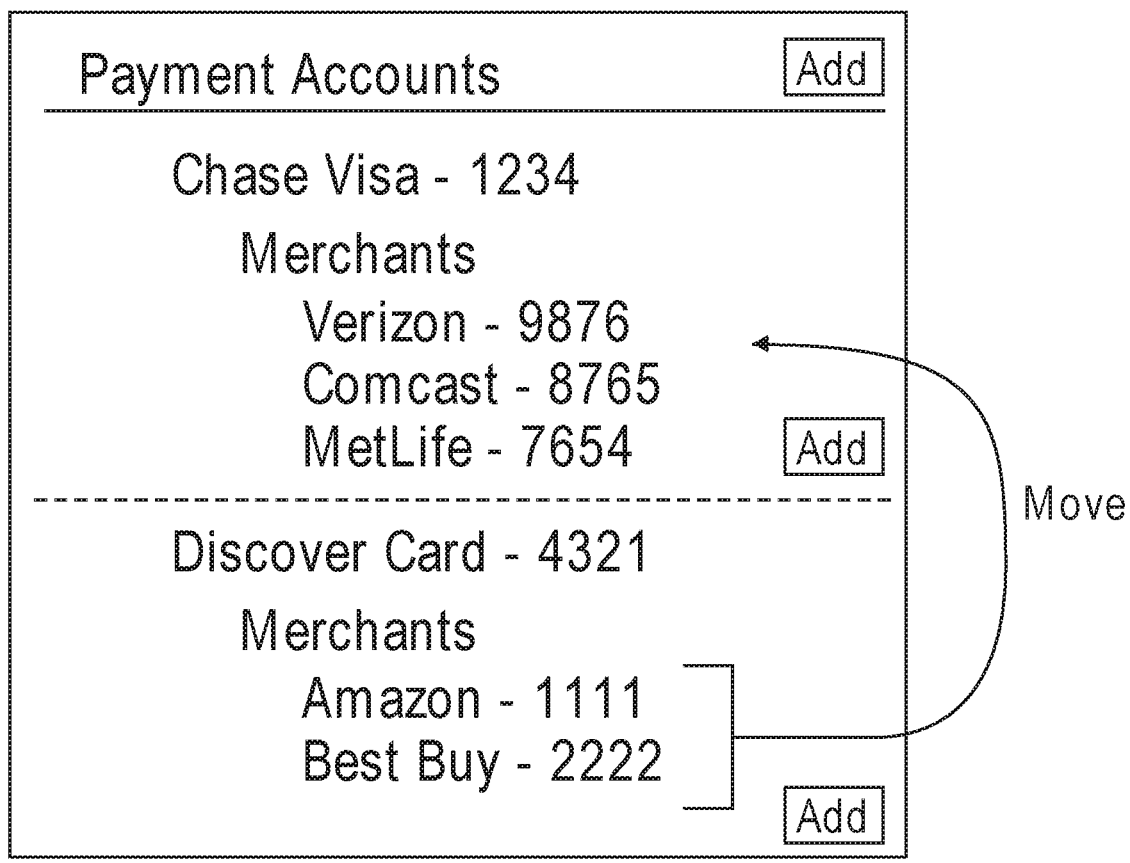
FIG. 9 shows an example of a digital wallet user interface according to an embodiment of the invention.

FIG. 9 shows an example of a user interface provided by a digital wallet provider according to embodiments of the invention. The user interface may be displayed to a user using a user device such as a mobile device or personal computer. The user may interact with the user interface using an input device of the user device such as a keyboard, mouse, touchscreen, etc.

The user interface may display a list or visualization of accounts stored and managed by the digital wallet provider. The user interface may further display a list or visualization of resource provider specific tokens linked to account data stored by the digital wallet provider. The user interface may comprise user-selectable commands to create, delete, and update account data linked to resource provider specific tokens. For example, the user interface may comprise user-selectable "buttons" such as an "add" button, "remove" button, or "move" button that generate a command to a digital wallet server computer to generate a resource provider specific token, remove a resource provider specific token, and link/unlink account data to resource provider specific tokens stored by the digital wallet provider respectively.

According to an embodiment of the invention, when a user wishes to update account data that is used to conduct transactions at a specific resource provider, a user may use an input device coupled to a user device such as a mouse or touchscreen to select a visualization of a resource provider specific token. The user may then use the input device to drag or move the selected visualization of the resource provider specific token. The user may drag the visualization of the resource provider specific token that is listed under or positioned adjacent to a visualization of one account identifier stored in the digital wallet to a position under or adjacent to a visualization of a different account identifier stored in the digital wallet. For example, the user may drag a visualization of a resource provider specific token for Amazon from a position adjacent to a visualization of an account identified as "Discover Card—4321" to a position adjacent to a visualization of an account identified as "Chase Visa—1234."

The digital wallet application stored on the user device may then communicate with the processor of the user device to generate an update request comprising a merchant ID for Amazon, an account selection indicating account information associated with "Chase Visa—1234," as well as a wallet ID identifying the digital wallet account associated with the user or user device. The digital wallet application may then communicate with the processor to transmit the update request using a network interface of the user device to a digital wallet server computer that may receive the update request and use the data therein to update account data stored in a digital wallet account database. The digital wallet server computer may query the digital wallet account database for the "wallet ID=47321" and "merchant ID=Amazon" received in an update request and unlink account information associated with "Discover Card—4321" from the resource provider specific token for "Wallet ID=47321" and "merchant ID=Amazon" (e.g. "resource provider specific token=1111") and then link account information associated with "Chase Visa—1234." The result or response to the update request may then be transmitted back to the user device and displayed to the user using the user interface provided by the digital wallet application. As a result, when the user conducts a transaction with Amazon, account information associated with "Chase Visa—1234" will be used to conduct the transaction rather than account information associated with "Discover Card—4321."

Embodiments of the invention provide for a number of advantages. Embodiments of the invention provide a method for managing account data that is an improvement in both speed and security over prior methods used by account data management systems. According to embodiments of the invention, account data is linked to resource provider specific tokens stored and managed by a digital wallet provider. Resource provider specific tokens may be stored by resource providers to conduct automatic transactions. To manage the resource provider specific tokens, a user may simply send requests to the digital wallet provider using a single interface displayed on a user device rather than by logging into accounts for numerous resource providers and continuously entering updated account data. This results in fewer processing steps for updating account data over prior art, and also results in fewer amount of chances for a criminal to intercept or hack account data. For example, embodiments of the invention prevent a criminal from stealing sensitive account information entered into an unsecure resource provider system when a user is attempting to update his or her account. In addition, according to embodiments of the invention, a hacker cannot use tokens stolen from one resource provider system to conduct numerous online transactions with other resource provider systems as each token is resource provider specific and are also validated against additional user details stored in a separate database. Furthermore, methods and systems according to embodiments of the invention can be easily implemented, as they do not require that a resource provider integrates with a digital wallet provider's system.

Some entities or components described herein may be associated with or operate one or more computer apparatuses to facilitate the functions described herein. Some of the entities or components described herein, including any server or database, may use any suitable number of subsystems to facilitate the functions.

Examples of such subsystems or components can be interconnected via a system bus. Additional subsystems such as a printer, keyboard, fixed disk (or other memory comprising computer readable media), monitor, which is coupled to display adapter, and others are shown. Peripherals and input/output (I/O) devices, which couple to I/O controller (which can be a processor or other suitable controller), can be connected to the computer system by any number of means known in the art, such as serial port. For example, serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium.

Embodiments of the invention are not limited to the above-described embodiments. For example, although separate functional blocks are shown for an issuer, payment processing network, and acquirer, some entities may perform a combination or all of these functions and may be included in some embodiments.

Messages between the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a system comprising a server computer, a request for a resource provider specific token provided by an interface of a digital wallet application on a user device, the request comprising a resource provider identifier for a resource provider and a selection of a first account;
requesting, by a token request module of the system comprising the server computer from a token provider computer, the resource provider specific token;
receiving, by the system comprising the server computer, the resource provider specific token;
linking and storing, by a token assignment module of the system comprising the server computer, the received resource provider specific token with the first account and the resource provider identifier;
providing, by the system comprising the server computer, the resource provider specific token to a resource provider computer operated by the resource provider;
receiving, by the system comprising the server computer, in a first transaction conducted by the resource provider computer, a first authorization request message comprising the resource provider specific token and the resource provider identifier;

determining, by the system comprising the server computer by communicating with the token provider computer, that the resource provider specific token is linked to the first account, and that the resource provider identifier in a database matches the resource provider identifier in the first authorization request message;

responsive to determining that the resource provider specific token is linked to the first account, and that the resource provider identifier in the database matches the resource provider identifier in the first authorization request message, modifying, by the system comprising the server computer by communicating with the token provider computer, the first authorization request message with an identifier of the first account;

forwarding the modified first authorization request message to a first issuer computer associated with a first issuer of the first account, where the first issuer of the first account approves or disapproves of the first transaction;

receiving, by the system comprising the server computer, a request to associate the resource provider specific token to a second account provided by the interface of the digital wallet application;

linking and storing in the database, by the token assignment module of the system comprising the server computer, the resource provider specific token with the second account and the resource provider identifier, the resource provider specific token no longer linked to the first account, receiving, by the system comprising the server computer, in a second transaction conducted by the resource provider computer, a second authorization request message comprising the resource provider specific token and the resource provider identifier;

determining, by the system comprising the server computer by communicating with the token provider computer, that the resource provider specific token is linked to the second account, and that the resource provider identifier stored in the database matches the resource provider identifier in the second authorization request message;

responsive to determining that the resource provider specific token is linked to the second account, and that the resource provider identifier in the database matches the resource provider identifier in the second authorization request message, modifying, by the system comprising the server computer by communicating with the token provider computer, the second authorization request message with the identifier of the second account; and forwarding the modified second authorization request message to a second issuer computer associated with a second issuer of the second account, where the second issuer of the second account approves or disapproves of the second transaction.

2. The method of claim 1, wherein the request to associate the resource provider specific token to the second account is sent from the digital wallet application in a memory of the user device.

3. The method of claim 1, wherein the resource provider specific token is of the same length and form, but being different from, the identifier of the second account.

4. The method of claim 3, wherein the identifier of the second account is a token specific to the user device.

5. A system comprising:
one or more processors; and
one or more computer readable media, the one or more computer readable media comprising code, executable by the one or more processors to implement a method comprising:

receiving a request for a resource provider specific token provided by an interface of a digital wallet application on a user device, the request comprising a resource provider identifier for a resource provider and a selection of a first account;

requesting, by a token request module from a token provider computer, the resource provider specific token;

receiving the resource provider specific token;

linking and storing by a token assignment module, the received resource provider specific token with the first account and the resource provider identifier;

providing the resource provider specific token to a resource provider computer operated by the resource provider;

receiving in a first transaction conducted by the resource provider computer a first authorization request message comprising the resource provider specific token and the resource provider identifier;

determining by communicating with the token provider computer that the resource provider specific token is linked to the first account, and that the resource provider identifier in a database matches the resource provider identifier in the first authorization request message;

responsive to determining that the resource provider specific token is linked to the first account, and that the resource provider identifier in the database matches the resource provider identifier in the first authorization request message, modifying, by communicating with the token provider computer, the first authorization request message with an identifier of the first account;

forwarding the modified first authorization request message to a first issuer computer associated with a first issuer of the first account, where the first issuer of the first account approves or disapproves of the first transaction;

receiving a request to associate the resource provider specific token to a second account provided by the interface of the digital wallet application;

linking and storing by the token assignment module in the database the resource provider specific token with the second account and the resource provider identifier, the resource provider specific token no longer linked to the first account, receiving in a second transaction conducted by the resource provider computer, a second authorization request message comprising the resource provider specific token and the resource provider identifier;

determining by communicating with the token provider computer that the resource provider specific token is linked to the second account, and that the resource provider identifier stored in the database matches the resource provider identifier in the second authorization request message;

responsive to determining that the resource provider specific token is linked to the first account, and that the resource provider identifier in the database matches the resource provider identifier in the first authorization request message, modifying, by communicating with the token provider computer, the second authorization request message with an identifier of the second account; and forwarding the modified second authorization request message to a second issuer computer associated with a second issuer of the second account, where the second issuer of the second account approves or disapproves of the second transaction.

6. The system of claim 5, wherein the resource provider specific token is of the same length and form, but being different from, the identifier of the second account.

7. The system of claim 5, wherein the identifier for the second account is a token specific to the user device, the user device being a mobile phone.

8. The method of claim 1, wherein the resource provider specific token has 16 digits.

9. The method of claim 1, wherein the identifier for the first account is a credit card number and the first account is a credit card account.

10. The method of claim 9, wherein the identifier for the second account is a debit card number and the second account is a debit card account.

11. The method of claim 9, wherein the server computer is a digital wallet server computer, and the system further comprises a payment processing network.

12. The method of claim 9, wherein the first authorization request message further comprises a first transaction amount.

13. The method of claim 12, wherein the second authorization request message further comprises a second transaction amount.

14. The method of claim 13, wherein the first transaction amount and the second transaction amount are the same.

15. The method of claim 14, wherein the first issuer is a first bank that issued the first account.

16. The method of claim 15, wherein the second issuer is a second bank that issued the second account.

17. The method of claim 16, wherein the resource provider is a merchant, and the first authorization request message further comprises a shipping address.

18. The method of claim 17, further comprising:
validating the first authorization request message by comparing the shipping address in the first authorization request message to another shipping address stored in the database along with the resource provider specific token and the identifier for the first account to determine that they match.

19. The method of claim 18, wherein the second authorization request message further comprises the shipping address, and wherein the method further comprises:
validating the second authorization request message by comparing the shipping address in the second authorization request message to the another shipping address stored in the database along with the resource provider specific token and the identifier for the second account to determine that they match.

20. The method of claim 19, wherein the first authorization request message and the second authorization request message are for recurring payments made to the merchant.

21. The method of claim 1, wherein the first authorization request message further comprises a transaction amount and an expiration date.

* * * * *